B. H. ALVEY.
ROTARY STEAM ENGINE.
APPLICATION FILED APR. 21, 1914.
1,283,614. Patented Nov. 5, 1918.
6 SHEETS—SHEET 1.
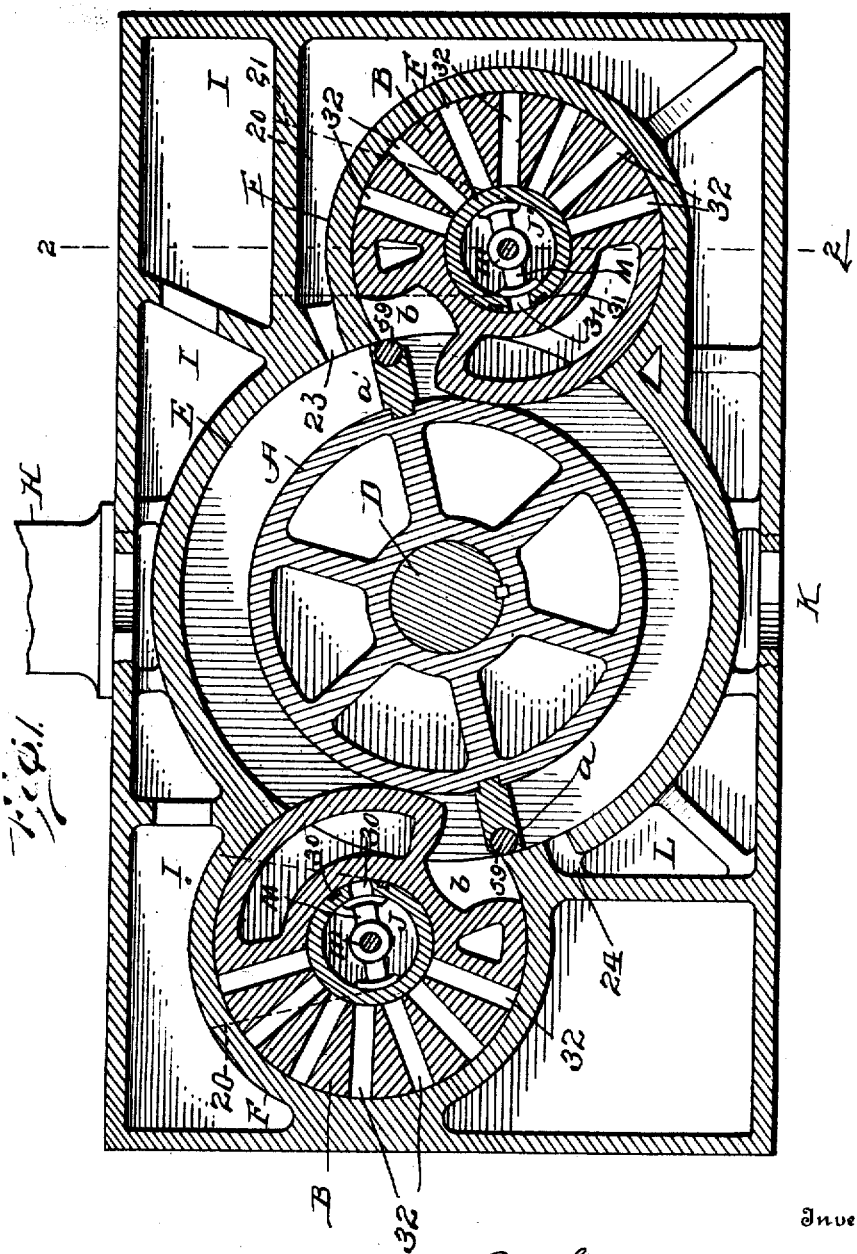

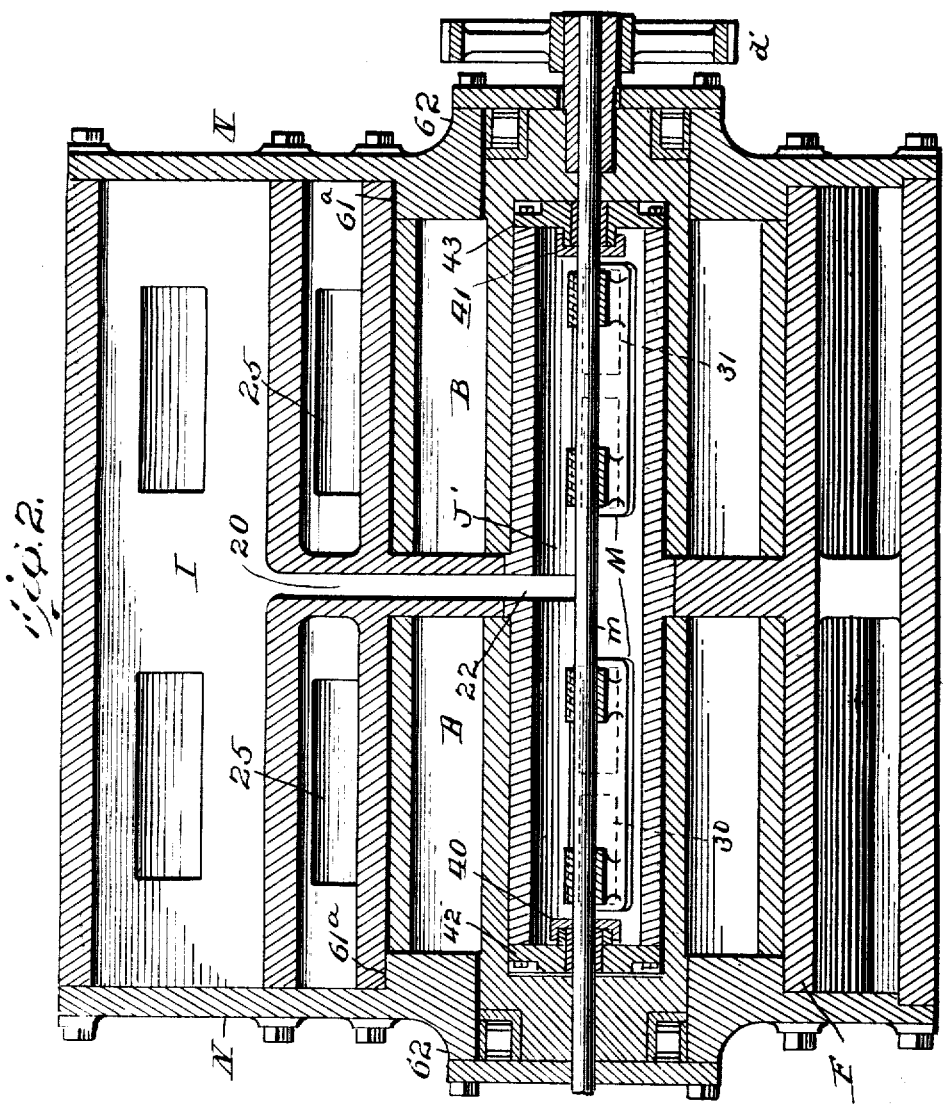

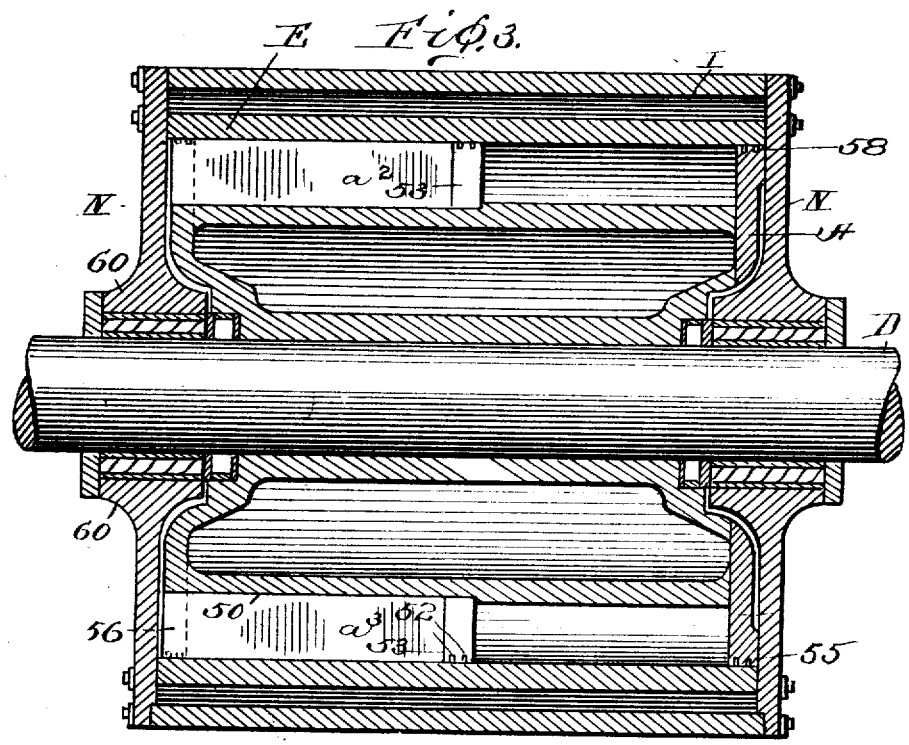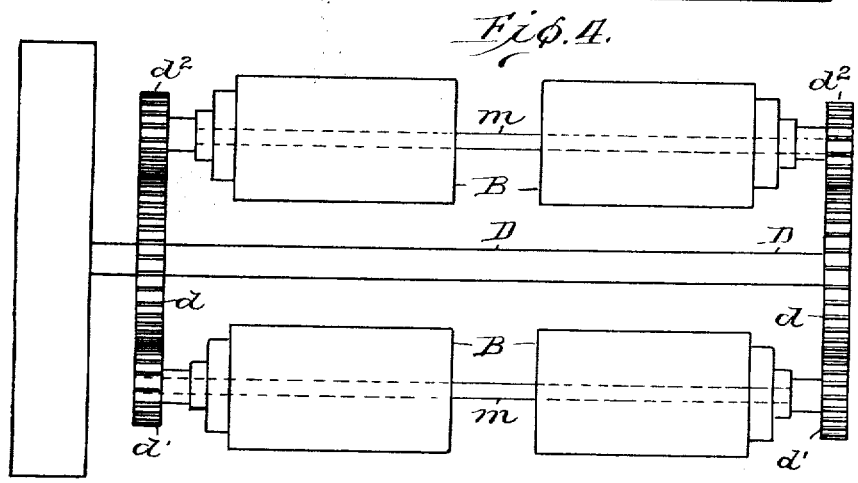

B. H. ALVEY.
ROTARY STEAM ENGINE.
APPLICATION FILED APR. 21, 1914.

1,283,614.

Patented Nov. 5, 1918.
6 SHEETS—SHEET 4.

Witnesses
Inventor
B. H. Alvey
By C. J. Stockman
Attorneys

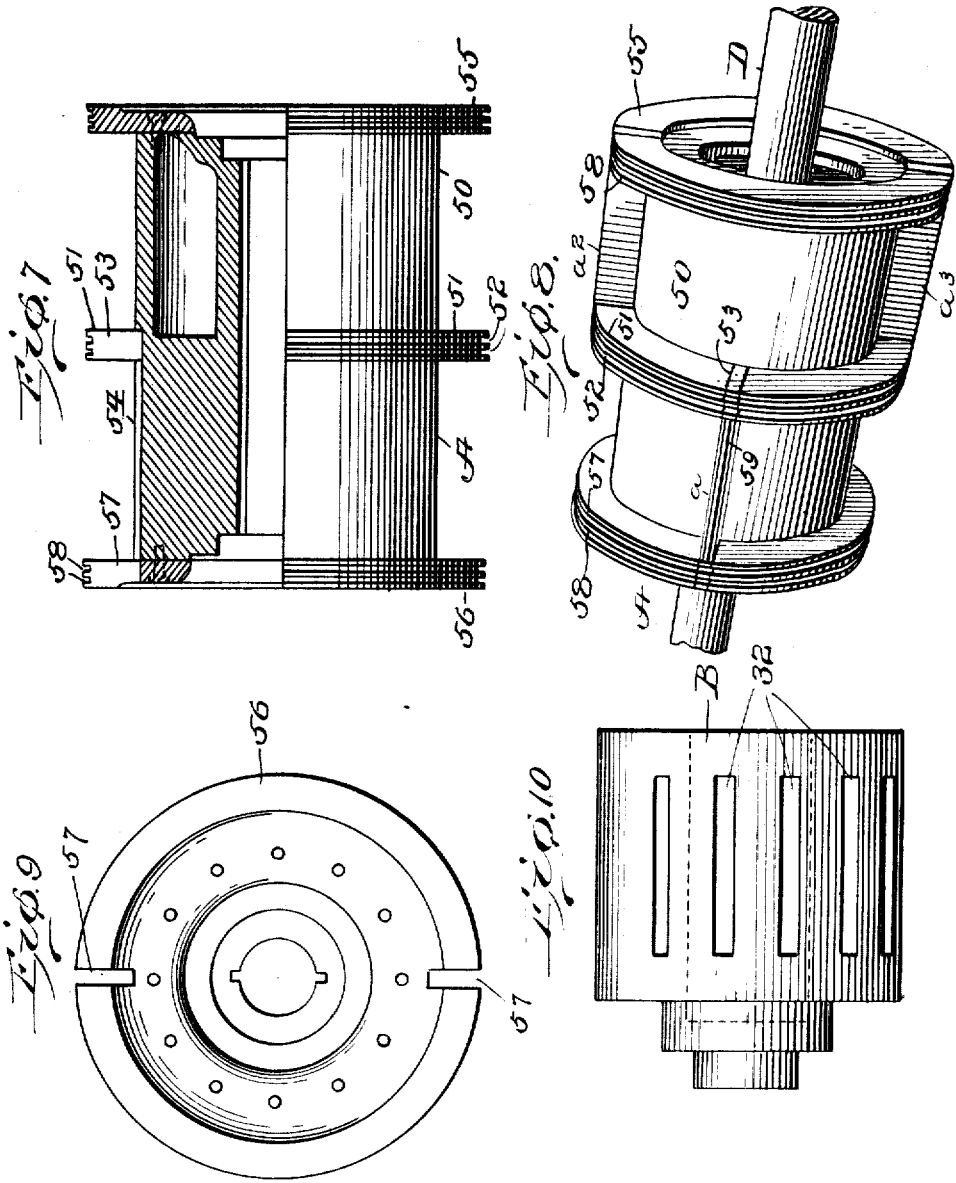

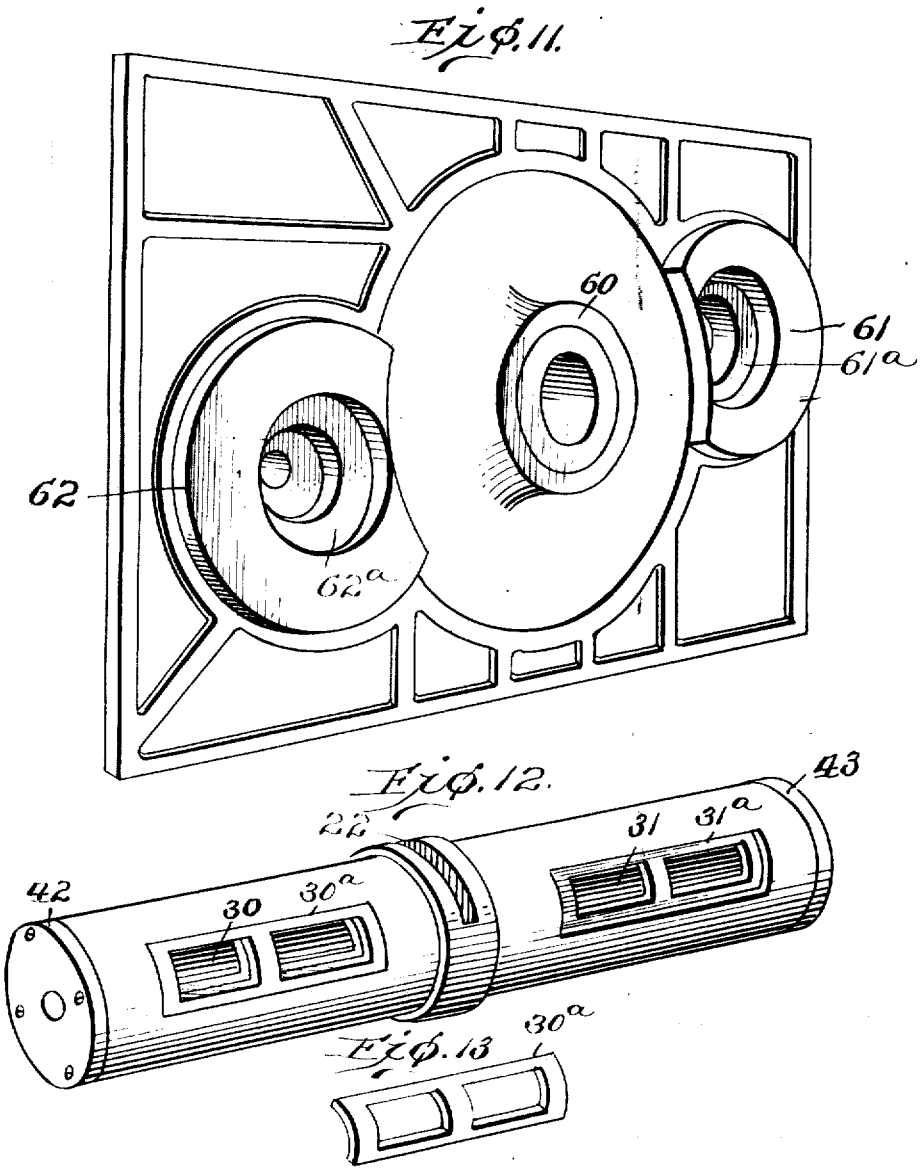

UNITED STATES PATENT OFFICE.

BENJAMIN H. ALVEY, OF ELIZABETHTOWN, KENTUCKY, ASSIGNOR TO UNIVERSAL CONVEYING MACHINERY CORPORATION, OF NEW YORK, N. Y., A CORPORATION OF NEW YORK.

ROTARY STEAM-ENGINE.

1,283,614.   Specification of Letters Patent.   Patented Nov. 5, 1918.

Application filed April 21, 1914. Serial No. 833,386.

*To all whom it may concern:*

Be it known that I, BENJAMIN H. ALVEY, a citizen of the United States, residing at Elizabethtown, in the county of Hardin and State of Kentucky, have invented new and useful Improvements in Rotary Steam-Engines, of which the following is a specification.

This invention relates to certain improvements in rotary engines particularly though not essentially of the kind which employ steam as the motive agent, and it has for its purpose the provision of a rotary engine having several new and useful features which contribute to the efficiency thereof and overcome disadvantages which have been experienced with other rotary engines and produce an engine of highly satisfactory and practicable character.

The invention consists in certain peculiarities in the construction of parts and in certain novel combinations of elements substantially as described and particularly pointed out in the subjoined claims.

In the accompanying drawings illustrating the invention:

Figure 1 is a transverse vertical section through the engine;

Fig. 2 is a longitudinal section through the engine on the line 2—2 of Fig. 1;

Fig. 3 is a vertical longitudinal section through the rotor and casing, with gearing omitted, taken on a plane immediately adjacent to two of the rotor blades;

Fig. 4 is a somewhat diagrammatic view showing the abutments and the gearing;

Fig. 7 is a detail view partly in section and partly in elevation showing the rotors with the blades omitted;

Fig. 8 is a perspective view of the rotor with the blades in place;

Fig. 9 is an end view of the rotor;

Fig. 10 is a detail view of one of the abutments;

Fig. 11 is a perspective view of one of the end plates or blades of the casing, looking at the inside thereof;

Fig. 12 is a perspective view of one of the internal steam boxes, showing one of its packing plates removed; and Fig. 13 is a detail view of said packing plate.

Corresponding characters of reference denote corresponding parts in the several views.

Figure 5:
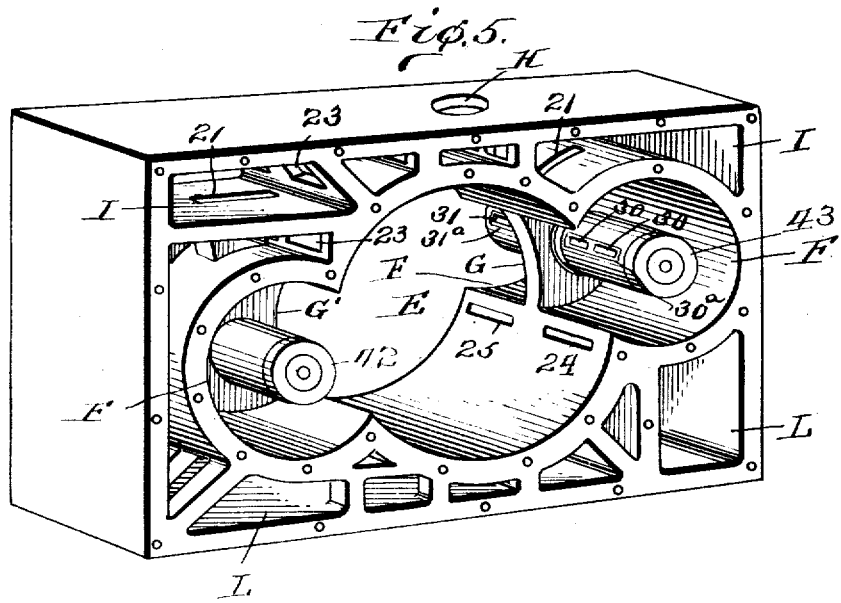
Fig. 5 is a perspective view of the casing and internal steam boxes.
Figure 6:
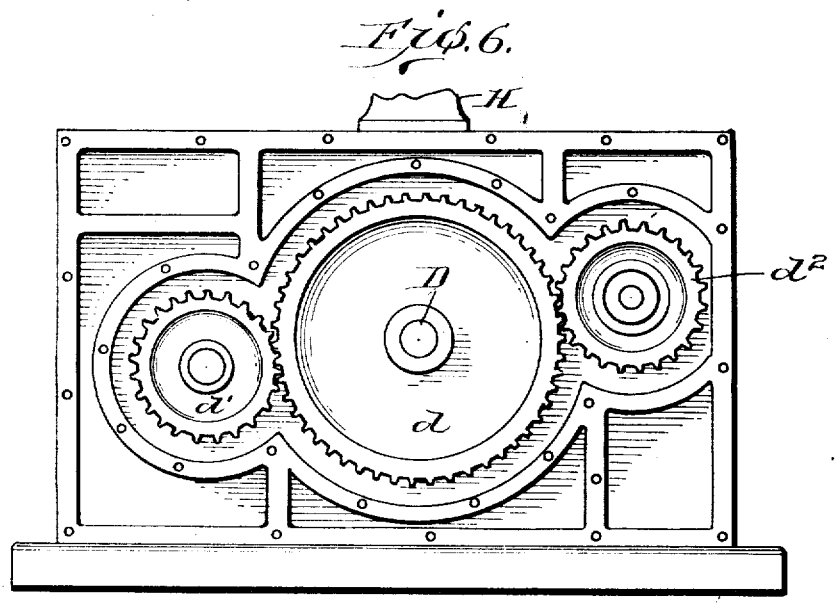
Fig. 6 is an elevation of one end of the engine.

The present invention has particular reference to that hitherto proposed type of rotary engine in which a rotor, as A, having blades or pistons $a$, $a'$, $a^2$ and $a^3$, is associated with rotary abutments, as B, which are arranged on opposite sides of the rotor and are so correlated therewith that their circumferential surfaces will be in contact with the circumference of the rotor, the said abutments having appropriate recesses $b$ which at times in the rotations of the parts receive the blades $a$, $a'$, $a^2$ and $a^3$ and permit the latter to pass by. The rotor is fixed upon a shaft D which is geared to the abutments to drive the latter, the gearing being preferably arranged at opposite ends of the engine. As herein shown each end of the shaft D has a gear $d$; each of said gears $d$ is preferably meshed with gears $d'$ and $d^2$ suitably connected to the respective abutments B B. In practice it is preferred that each abutment be one-half the diameter of the rotor but rotate at twice the speed of the latter, and this arrangement of parts accordingly is shown in the accompanying drawings. It further is preferred, and accordingly herein illustrated, to embody in the engine a rotor with four blades $a$—$a^3$ two of which blades, as $a$ and $a'$ are arranged at one side of the vertical center of the rotor and at diametrically opposite sides of the latter, and the other two of which blades, $a^2$, $a^3$, are at the other side of said longitudinal center of the rotor at diametrically opposite sides of the same, the blades at one side of the longitudinal center of the rotor alternating in arrangement with those at the other side of said center, so that the four blades are set on the quarters of the rotor. Associated with this rotor are four abutments B, two of which are arranged one after the other on one side of the rotor and the other two of which are similarly arranged one after the other on the opposite side of the rotor, the first two being arranged for example to coöperate with the blades $a$, $a'$, and the other two with the blades $a^2$, $a^3$.

The casing of the engine (see Fig. 5) herein illustrated to exemplify what is at present regarded to be the best detail embodiment of the present invention, is formed to provide an internal rotor chamber E, which extends from front to rear of the casing, and abutment chambers F arranged on opposite sides of the rotor chamber. The abutment chambers at one side of the rotor-chamber are separated from each other by a partition G and the corresponding chambers at the other side of the rotor chamber are separated from each other by a partition G'. The casing is also provided at an appropriate place with a suitable steam-inlet opening H and with a live steam chamber I which extends over the rotor-chamber and abutment-chambers. The partitions G and G' are hollow to form steam channels 20 (shown best in Fig. 2) whose outer ends open into the steam chamber I, through ports 21, and whose inner ends have communication with internal steam boxes J, J', which boxes are arranged in the abutment chambers, extend through the partitions G, G' and have steam inlet ports 22 registering with the inner ends of the channels 20, respectively.

The casing also has at appropriate places an exhaust outlet opening K and an exhaust chamber L leading thereto and the rotor chamber E is provided with two pairs of exhaust ports leading to said chamber. One pair of exhaust ports, marked 23 and 24, are arranged at diametrically opposite sides of the rotor chamber E and adjacent to the respective abutment chambers. These exhaust ports are arranged on one side of the vertical plane of the partition walls G, G' while the other two exhaust ports, one of which, marked 25, is seen in Fig. 5, are similarly arranged on the other side of said vertical plane.

As already stated, the illustrated arrangement is designed for use in connection with a rotor having four blades and four rotary abutments. Two of the abutments are mounted to rotate upon one of the internal steam boxes J and are arranged upon opposite sides of the web or partition G associated with said box, while the other two abutments are mounted to rotate upon the other steam box, J', and are located upon opposite sides of the partition G' associated with the latter. Each steam box has steam outlets 30 and 31 for the supply of steam to the interiors of the abutments mounted thereon, and said abutments each has a series of radial channels 32 forming steam passages which extend from its axis outward through its periphery, and through which steam is supplied to the rotor chamber, the abutments thereby performing the additional function of valves for controlling the supply of steam to the rotor chambers. The inner ends of said passages 32 in each abutment are successively brought into registration with the appropriate steam outlets 30 and 31 at proper times in the rotation of the abutment and bear such relation to each other and to the particular steam box outlet with which they are associated that one will be in communication with said outlet before the other passes out of communication therewith.

The steam passages 32 in each abutment are so arranged that steam will be admitted therethrough during approximately one-half the revolution of the abutment—approximately one-half of the abutment being unprovided with such passages—and as each abutment turns twice during the single revolution of the rotor it will be apparent that during each revolution of the rotor each blade is acted upon twice by the impact and twice is subjected to the expansive force of the steam, the phases of impact and expansion alternating. Moreover, the described correlation of the parts is such that the two opposite blades $a$ and $a'$ simultaneously receive steam through their respective abutments, and also such that the spaces containing the steam which has acted upon them are both open at the same time to the exhaust openings 23 and 24, the exhaust occuring when the blades $a$ and $a'$ have passed the respective exhaust openings 23 and 24, that is, during the last portion of the revolution and while the steam is not being admitted to the blades $a$ and $a'$. Moreover, the described correlation of the parts is such that when said blades $a$ and $a'$ are being subjected to impact of steam the other blades $a^2$ and $a^3$ are being subjected to the expansive force of the steam and exhausting during the remainder of such time. Moreover, the supply of steam simultaneously from inlets arranged on diametrically opposite sides of the rotor results in a balancing of the pressures exerted toward the axis of the rotor, the rotor presenting to the steam inlets on opposite sides of its axis areas of like increasing extent but always of extent equal to each other.

The described correlation of parts results in an engine which can be started under load from any position in which the rotor has stopped and contributes to the production of a smoothly running and efficient engine of the rotary type.

Other features of construction which contribute to the smooth running qualities and efficiency of the engine will now be described.

Mounted in each internal steam box J, J' and controlling the outlet ports 30 and 31 thereof are two valves M. These valves are mounted upon shafts or valve stems m and said stems are suitably connected with any appropriate governor which will operate automatically to move the valves to cover more or less of the ports 30 and 31 when there is any variation in load which causes the engine to run faster or slower.

The ports 30 and 31 are preferably packed by plates 30ª set into the recesses 31ª in said ports with their outer surfaces flush with the circumferential surfaces of the steam boxes, and each valve stem m extends through stuffing boxes 40, 41 arranged at opposite ends of its steam box, each of said steam boxes preferably having removable heads 42, 43 at its ends, which heads carry said stuffing boxes.

As shown most clearly in Figs. 7 and 8, the rotor A comprises a cylindrical body 50 which is provided between its ends with an annular flange 51, said flange preferably having peripheral recesses 52 for packing rings; said flange 51 also has transverse apertures 53 corresponding in number and location to the number and location of the pistons or blades $a-a^3$. The cylindrical body 50 is also formed with grooves 54 which are alined with the apertures 53 in said flange. The rotor is further provided with annular flanges 55 and 56 arranged at the ends thereof. One of these annular flanges, as 56, is preferably made separate, in the form of a ring, from the body of the rotor and detachably secured to the latter. They have apertures 57 which are alined with the apertures 53 and grooves 54 in the flange 51 and body 50 respectively, and have their peripheral surfaces provided with recesses 58 to receive packing rings. The blades $a-a^3$ are mounted on the rotor with their inner longitudinal edges in the longitudinal grooves 54 and their ends in the apertures 53 and 57, there being as shown two of said blades on each side of the central flange 51. The blades are not immovably secured to the rotor but are free to move outward by centrifugal force toward the inner wall or surface of the casing. The grooves 54, which form seats for the inner longitudinal edges of said blades, are of suitable depth to prevent escape of steam around said edges; that is to say, are of such depth that the blades will never be free from said grooves. The tendency of the steam is to hold the edges of the blades against the forward wall of the grooves or seats 54 and the apertures in the flanges guide the blades in their movements. To prevent escape of steam around the outer edges of the blades the latter are packed. The packing preferably employed for this purpose is in the form of metal rollers 59 arranged to make contact with the casing wall. This packing thus being a rolling one reduces friction between the blades and casing wall and as their rotary movement is rearward their tendency is to roll the steam back, so to speak, thereby adding to their effectiveness.

The flanges 55 and 56 form end walls of steam spaces around the rotor, said flanges coöperating with the circumferential surface of the rotor and the blades to form steam chambers, as best shown in Fig. 8. As the several parts referred to move with the rotor, the friction of steam due to stationary walls at the ends of the rotor is eliminated and waste of steam is avoided, the chambered construction described being such as to lend itself to the hereinbefore described packing of the parts which effectually overcomes any tendency to loss of steam.

The construction of the front and rear plates or heads N are or may be substantially identical with each other. One of the same is shown in detail in Fig. 11. It will be noted that it is formed with a central boss 60 which sustains the end of the shaft D, and with other bosses 61 and 62, the latter bosses being arranged in line with and close to the contiguous ends of the abutment chambers and having their confronting edges cut away to form shoulders 61ª and 62ª, which shoulders complete the continuity of the ends of the rotor chamber by bridging the spaces at the ends of the places where the abutment chambers are cut away to enable the abutments to project into said rotor chamber. The bosses 61 and 62 further provide seats for the ends of the abutments and bearings for the abutment shafts and also sustain the plate or head in proper position.

From the foregoing, the construction, operation and advantages of the present invention will be readily understood, and it should be understood that while I have described the invention restrictively, changes in the details may be made and the invention otherwise and variously embodied without departing from its spirit or the scope of the subjoined claims.

Having now described the invention what I believe to be new and desire to secure by Letters Patent, is:—

1. In a rotary engine, the combination with a rotor having four blades, two of said blades being arranged diametrically opposite to each other at one end of the rotor and the other two blades being arranged diametrically opposite to each other at the other end of the rotor and in positions alternating with those of the first two, of four rotary abutments, two of said abutments being arranged on one side of the axis of the rotor and the other two arranged on the opposite side of the rotor, said abutments being arranged to make circumferential contact with the body of the rotor and being provided with recesses to permit the rotor blades to pass by, the pitch diameter of each abutment being approximately one-half the pitch diameter of the rotor, means for driving the abutments at approximately twice the speed of the rotor, and means for supplying motive fluid to the interiors of the abutments, said abutments having channels which extend through their circumferential surfaces and are arranged at the sides of said recesses, the abutments being relatively so arranged that the motive fluid will be simultaneously supplied through two of the same to the blades at one end of the rotor at times alternating with the simultaneous supply of motive fluid through the other abutments to the blades at the other end of the rotor.

2. In a rotary engine, a casing having a rotor chamber and abutment chambers, said abutment chambers being arranged on opposite sides of the rotor chamber in pairs and with a division wall between the chambers of each pair, said division walls having channels, the casing also having means through which motive fluid is supplied to the channels in the division walls, the abutment chambers being open to the rotor chamber at opposite sides of the latter, and said rotor chamber having exhaust ports, a rotor having blades, rotary abutments mounted in the abutment chambers on opposite sides of the division walls and arranged to circumferentially contact with the body of the rotor, each abutment having a channel for motive fluid, said channel extending through the circumferential surface of the abutment, each abutment also having a recess in its circumferential surface to accommodate rotor-blades, and means through which the channels in the abutments have communication with the channels in the division walls at times in the rotations of the abutments.

3. In a rotary engine, a casing having a rotor chamber, an abutment chamber, said abutment chambers being arranged on opposite sides of the rotor chamber in pairs and with a division wall between the chambers of each pair, said division walls having channels, the casing also having means through which motive fluid is supplied to the channels in the division walls, the abutment chambers being open to the rotor chamber at opposite sides of the latter, and said rotor chamber having exhaust ports, a rotor having blades, rotary abutment mounted in the abutment chambers on opposite sides of the division walls and arranged to circumferentially contact with the body of the rotor, each abutment having a channel which extends through its circumferential surface and also having a recess in its circumferential surface to accommodate rotor-blades, means through which channels in the abutments have communication with the channels in the division walls at times in the rotation of the abutments, said parts being relatively so arranged that the motive fluid will simultaneously be supplied to the rotor chamber through two opposite abutments while the other two abutments are cutting off the supply of steam the pitch diameter of the abutments being approximately one-half the pitch diameter of the rotor, and means for rotating the abutments from the rotor at approximately twice the speed of the latter.

4. In a rotary engine, a casing having a rotor chamber and abutment chambers, said abutment chambers being arranged on opposite sides of the rotor chamber in pairs and with a division wall between the chambers of each pair, said division walls having channels, the casing also having means through which motive fluid is supplied to the channels in the division walls, the abutment chambers being open to the rotor chamber at opposite sides of the latter, and said rotor chamber having exhaust ports, a rotor having blades, rotary abutments mounted in the abutment chambers on opposite sides of the division walls and arranged to circumferentially contact with the body of the rotor, each abutment having a steam channel which extends through its circumferential surface and also having a recess in its circumferential surface to accommodate rotor-blades, and internal boxes mounted in the axes of the abutments and having inlet ports in communication with the channels of the division walls and outlet ports through which the channels in the abutments are supplied with the motive fluid.

5. In a rotary engine, a casing having a rotor chamber, and abutment chambers, said abutment chambers being arranged on opposite sides of the rotor chamber, in pairs and the casing having a division wall between the chambers of each pair, said division walls having channels for motive fluid, the casing also having means through which steam is supplied to the channels in the division walls, the abutment chambers being open to the rotor chamber at opposite sides of the latter and said rotor chamber having exhaust ports, the casing also having an exhaust chamber with an exhaust outlet, a rotor having blades mounted on each of its opposite ends, the blades at one end of the rotor being arranged in an alternating relation with those on the other end thereof, rotary abutments mounted in the abutment chambers on opposite sides of the division walls and arranged to circumferentially contact with the body of the rotor, each abutment having a channel for motive fluid which extends through its circumferential surface and also having a recess in its circumferential surface, internal boxes mounted in the axes of the abutments and having inlet ports in communication with the channels of the division walls and outlet ports through which the channels in the abutments are supplied with the motive fluid, said abutments being relatively so arranged that the motive fluid will simultaneously be supplied to the rotor chamber through two opposite abutments while the other two abutments are cutting off the supply of the fluid and the pitch diameter of the abutments being approximately one half the pitch diameter of the rotor, and means for rotating the abutments from the rotor at approximately twice the speed of the latter.

6. A rotary engine comprising a rotor, a combined rotary abutment and valve, and an internal box for the motive fluid, arranged in the axis of said combined abutment and valve; said box having an outlet port and said combined abutment and valve having a plurality of channels extending through its circumference from the box, the inner ends of said channels being relatively so arranged that before one passes out of communication with the outlet port of the box the next will be in communication with said port.

7. A rotary engine comprising a rotor having oppositely arranged blades projecting from each end of its body, a plurality of combined rotary abutments and valves arranged on opposite sides of the rotor and corresponding in number with the number of blades, and supply means for the motive fluid arranged in the axis of each combined abutment and valve and having an outlet port to the latter, and each combined abutment and valve having a circumferential recess to accommodate the blades of the rotor and also having a plurality of channels extending through its circumference from the steam supply means, the inner ends of said channels of each abutment being relatively so arranged that before one passes out of communication with the outlet port of the supply means in its abutment the next will be in communication with said port, and the outer ends of said channels being arranged at one side of the circumferential recess in the abutment, said abutments being relatively so arranged that the motive fluid will simultaneously be supplied to act on the blades at one end of the rotor through two of the same and simultaneously cut off from the blades at the other end of the rotor by the outer abutments.

8. A rotary engine, comprising a rotor, a combined rotary abutment and valve, an internal box for the motive fluid, arranged in the axis of said abutment and valve, said box having an outlet port and said abutment and valve having a channel which extends from its axis outward through its circumference and a valve arranged to be controlled by a governor for cutting off more or less of said outlet port automatically when the speed of the engine varies.

9. In a rotary engine, a rotor comprising a body, annular projections from the ends of said body and blades extending longitudinally of the body from one projection to the other, said body having longitudinal openings and said projections having apertures alined with said openings, and said blades having their inner longitudinal edges loosely mounted in said openings and their ends arranged in said apertures.

10. In a rotary engine, a rotor comprising a body having an annular projection approximately midway of its length and other annular projections at its ends, a pair of blades loosely mounted on and extending longitudinally of the body from the first-named projection to one of the end projections and arranged at diametrically opposite sides of the rotor, and a second pair of blades similarly arranged at diametrically opposite sides of the body and extending longitudinally thereof from said first-named projection to the other end projection, the blades of one pair alternating in position with those of the other pair.

11. In a rotary steam engine, a combined abutment and valve having an internal bore and a steam channel which extends from said bore outward through its circumference, a steam box upon which the combined abutment and valve rotates, which steam box is provided with a port with which the steam channel intermittently registers and a movable governor controlled valve disposed within the steam box and arranged to cover and uncover the port thereof.

12. In a rotary steam engine, a combined abutment and valve having an internal bore and a steam channel which extends from said bore outward through its circumference, a steam box upon which the combined abutment and valve rotates, which steam box is provided with a port with which the steam channel intermittinently registers and a movable governor controlled two-part valve rotatatively mounted within the steam box and the parts of which successively control the port of the steam box.

13. In a rotary engine, a rotor comprising a body having an annular projection approximately midway of its length and other annular projections at its ends, a pair of blades loosely mounted on and extending longitudinally of the body from the first-named projection to one of the end projections and arranged at diametrically opposite sides of the rotor, and a second pair of blades similarly arranged at diametrically opposite sides of the body and extending longitudinally thereof from said first-named projection to the other end projection, the blades of one pair alternating in position with those of the other pair, and packing on the outer edges of all said projections.

14. In a rotary engine, a rotor comprising a body having an annular projection approximately midway of its length and other annular projections at its ends, a pair of blades loosely mounted on and extending longitudinally of the body from the first-named projection to one of the end projections and arranged at diametrically opposite sides of the rotor, and a second pair of blades similarly arranged at diametrically opposite sides of the body and extending longitudinally thereof from said first-named projection to the other end projection, the blades of one pair alternating in position with those of the other pair, and packing elements for the outer edges of the projections, including rotatably-mounted packings for the longitudinal elements extending from one to the other of adjacent projections.

15. In a rotary steam engine having a rotor provided with a piston, a combined abutment and valve having a plurality of radial channels extending from its axis through its circumference, the outer ends of the channels being closely spaced to provide successive motive impulses for the piston, and a steam box mounted in the axis of the combined abutment and valve and having a steam outlet, said abutment and valve being mounted to rotate on the steam box and having the inner ends of its channels arranged to successively register with the outlet in the steam box.

16. In a rotary steam engine, a combined abutment and valve having a plurality of radial channels extending from its axis through its circumference, and a steam box mounted in the axis of the combined abutment and valve and having a steam outlet, said abutment and valve being mounted to rotate on the steam box and having the inner ends of its channels arranged in such contiguity to each other that one will be in partial registration with the outlet in the steam box before the next one has passed out of registration therewith.

17. In a rotary steam engine, a combined abutment and valve having a steam channel which extends from its axis outward through its circumference, and also having a circumferential recess at one side of the end of said channel, and an internal steam box mounted in the axis of the combined abutment and valve and provided with an outlet aperture, the combined abutment and valve being mounted to rotate on said box to cause its channel to intermittently register with said outlet, said box having a grooved face adjacent to the outlet and a packing plate set into said groove and having its outer surface flush with the surface of the box.

18. In a rotary steam engine, a pair of combined abutments and valves each having a steam channel which extends from its axis outward through its circumference, and an internal steam box mounted in the axes of both of said abutments and valve and provided with an inlet opening between the same, the box also having openings to the steam channels in the abutments and valves, respectively.

19. In a rotary steam engine, a pair of abutments, each having a plurality of radial steam channels whose inner ends are close together, the said steam channels extending outward from the axes of the respective abutments through the circumference of the latter, each abutment also having its section from one end-channel to the opposite end-channel formed imperforate to constitute a cut-off, and an internal steam box mounted in the axes of both of the combined abutments and valves and provided with an inlet opening between the latter and with outlet openings to the channels of the respective abutments and valves.

20. In a rotary steam engine, a pair of abutments, each having a plurality of radial steam channels whose inner ends are close together, the said steam channels extending outward from the axes of the respective abutments through the circumference of the latter, each abutment also having its section from one end-channel to the opposite end-channel formed imperforate to constitute a cut-off, an internal steam box mounted in the axes of both of the combined abutments and valves and provided with an inlet opening between the latter and with outlet openings to the channels of the respective abutments and valves and a throttle valve mounted to vibrate in the steam box and arranged to be operated by a governor.

21. In a rotary steam engine, a casing having a chamber for live steam, a rotor chamber extending from one side of the casing to the other and abutment chambers arranged on opposite sides of the rotor chamber and opening into the latter, combined with end plates each having a boss in line with the rotor chamber and other bosses in line with the abutment chambers, the bosses which are in line with the abutment chambers having their surfaces which are adjacent to the rotor chamber cut away on the arcs of the latter, and a rotor and abutments mounted in the rotor and abutment chambers, respectively, and having shafts borne by said bosses.

In testimony whereof I have hereunto set my hand in presence of two subscribing witnesses.

BENJAMIN H. ALVEY.

Witnesses:
C. J. STOCKMAN,
JNO. M. ALVEY.